United States Patent [19]

Goko et al.

[11] Patent Number: 4,808,667

[45] Date of Patent: Feb. 28, 1989

[54] METHOD FOR PRODUCING AN α-OLEFIN BLOCK COPOLYMER

[75] Inventors: Nobuaki Goko; Yumito Uehara; Yasuhiro Nishihara, all of Kurashiki, Japan

[73] Assignee: Mitsubishi Chemical Industries Limited, Tokyo, Japan

[21] Appl. No.: 75,619

[22] Filed: Jul. 20, 1987

[30] Foreign Application Priority Data

Jul. 22, 1986 [JP] Japan ............................ 61-172422
Jul. 23, 1986 [JP] Japan ............................ 61-173456

[51] Int. Cl.$^4$ ............................................ C08F 297/08
[52] U.S. Cl. ................................... 525/247; 524/267; 524/269; 524/536; 524/731; 524/254; 524/270
[58] Field of Search ................... 525/247, 270, 254; 524/536, 731, 267, 269

[56] References Cited

U.S. PATENT DOCUMENTS 4,380,608   4/1983   Hasuo et al. ................... 525/247
4,547,552  10/1985   Toyota et al. .................. 525/247

Primary Examiner—Wilbert J. Briggs, Sr.
Attorney, Agent, or Firm—Oblon, Fisher, Spivak, McClelland & Maier

[57] ABSTRACT

A method for producing an α-olefin block copolymer, which comprises polymerizing propylene alone or together with a small amount of other α-olefin in the presence of a catalyst comprising a titanium-containing solid catalyst component and an organoaluminum compound, and then polymerizing the resulting propylene polymer with an α-olefin other than propylene, alone or together with propylene in a gas phase without deactivating the catalyst, characterized in that the gas phase polymerization is conducted in the presence of a siloxane or a polysiloxane in an amount of from $1 \times 10^{-6}$ to 0.1 by weight ratio relative to the weight of said propylene polymer.

5 Claims, No Drawings

METHOD FOR PRODUCING AN α-OLEFIN BLOCK COPOLYMER

The present invention relates to a method for producing an α-olefin block copolymer. More particularly, it relates to a method for producing a propylene-α-olefin block copolymer at a high reactor volumetric efficiency by polymerizing a formed propylene polymer with an α-olefin other than propylene or copolymerizing it with propylene and other α-olefin in a gas phase without deactivating the catalyst while avoiding adhesion of polymer particles among themselves or to the inner wall of the reactor, or clogging of the pipeline in the subsequent step or solidification in a silo or hopper.

In recent years, the performance of the polymerization catalysts for the polymerization of an α-olefin such as ethylene or propylene has been remarkably improved, and the yield of the polymer per the catalyst component has been remarkably improved, whereby it has been made possible that the transition metal catalyst component remaining in the formed polymer can be adequately minimized so that the step of removing the catalyst can be omitted.

On the other hand, as methods for the polymerization of such an α-olefin, there are slurry polymerization which is conducted in an inert hydrocarbon solvent, bulk polymerization which is conducted in a liquefied monomer such as liquefied propylene and gas phase polymerization which is conducted in a gas phase. Attention has been drawn to the gas phase polymerization in recent years for the reasons that the gas phase polymerization requires no solvent, whereby no recovery or purification step for the solvent is required, and the recovery of the monomer and the drying of the polymer product can readily be conducted.

In the field of a block copolymer of propylene with other α-olefin, a gas phase block copolymerization method is known wherein a propylene polymer is produced in a first step and in a subsequent step, the polymer is polymerized with other α-olefin or copolymerized with propylene and other α-olefin in a gas phase. In addition to the economical reason as mentioned above, the gas phase block copolymerization method has an advantage over the method wherein the second step polymerization is conducted in an inert hydrocarbon solvent or in liquefied propylene in that a variety of products can thereby be obtained. However, the gas phase polymerization method has a serious drawback that the monomer concentration is relatively low, and the reaction rate is low, whereby the reactor volume is obliged to be large.

In the gas phase polymerization, the energy required for mixing the polymer powder, e.g. the power for driving a blower for circulating gas in the case of a fluidized bed or the power for stirring in the case of an agitation tank, is required to be high, and not only the construction cost but also the operation cost will be substantially affected by the size of the gas phase reactor. In this connection, for example, Japanese Unexamined Patent Publication No. 151713/1981 proposes to add an aluminum alkoxide of the formula $R_mAl(OR^4)_{3-m}$ wherein $R^3$ is at least one of an alkyl group, an aryl group and a halogen atom, $R^4$ is an alkyl group or an aryl group, and m is 0, 1 or 2 during the gas phase polymerization, and Japanese Unexamined Patent Publication No. 213012/1983 proposes to add in addition to the above-mentioned aluminum alkoxide a hydrocarbon containing no more ethylenic double bonds than required to form a saturated vapor pressure, and thus it has been attempted to improve the polymerization rate.

However, in these methods, a substantial reduction in the stereoregularity i.e. an increase of a non-crystalline polymer, is observed, although the reaction rate can be improved by the addition of the aluminum alkoxide. Therefore, due to formation of aggregates by the adhesion of polymer particles to one another in the reactor or due to deposition of the polymer on the wall of the polymerization tank, it becomes difficult to maintain normal operation. Besides, clogging of the pipeline or solidification of the polymer in a silo or hopper is likely to result. Further, this method has a drawback that the quality of the products is likely to be adversely affected. Furthermore, in order to uniformly add a small amount of an aluminum alkoxide to the polypropylene polymer powder obtained in the first step, it will be required to use a substantial amount of a diluent for spraying. Consequently, elution of the soluble polymer into the diluent is likely to take place, whereby the adhesion trouble as mentioned above, is likely to be brought about. Further, a drying step will be required for the removal of the diluent, and the corresponding installation and equipments will be required.

The present inventors have made extensive studies to subtantially improve the gas phase polymerization rate without bringing about the adhesion phenomenon due to an increase of the non-crystalline polymer or due to the introduction of a diluent as mentioned above. As a result, they have found that when a certain specific substance is present during the polymerization of the propylene polymer with an α-olefin other than propylene, alone or together with propylene, in a gas phase, the reaction rate can be substantially improved, and it is possible to obtain a block copolymer having excellent flowability without adhesion of the polymer particles. The present invention has been accomplished on the basis of this discovery.

The present invention provides a method for producing an α-olefin block copolymer, which comprises polymerizing propylene alone or together with a small amount of other α-olefin in the presence of a catalyst comprising a titanium-containing solid catalyst component and an organoaluminum compound, and then polymerizing the resulting propylene polymer with an α-olefin other than propylene, alone or together with propylene in a gas phase without deactivating the catalyst, characterized in that the gas phase polymerization is conducted in the presence of a siloxane or a polysiloxane in an amount of from $1 \times 10^{-6}$ to 0.1 by weight ratio relative to the weight of the propylene polymer obtained in the first step.

Now, the present invention will be described in detail.

As the titanium-containing solid catalyst component, a conventional carrier-supported type catalyst component comprising a solid magnesium compound, a titanium compound and a halogen, may be used. However, it is preferred to use the one composed essentially of titanium trichloride. As the catalyst component composed essentialy of titanium trichloride, conventional titanium trichloride may be used. For example, there may be mentioned titanium trichloride pulverized in a ballmill and subjected to activating treatment; titanium trichloride obtained by further subjecting such titanium trichloride to solvent extraction; titanium trichloride obtained by treating β-type titanium trichloride with a complexing agent such as an ether, and further treating it with titanium tetrachloride to bring the aluminum content to a level of not higher than 0.15 by atomic ratio ralative to titanium; and titanium trichloride obtained by treating titanium tetrachloride with an organoaluminum compound in the presence of an ether to form a liquid product, and heating the liquid product for solidification to bring the aluminium content to a level of not higher than 0.15 by atomic ratio relative to titanium.

Among these titanium trichlorides, particularly preferred is the one wherein the aluminum content is not higher than 0.15, preferably not higher than 0.1, more preferably not higher than 0.02, by atomic ratio relative to titanium, and which contains a complexing agent.

The organoaluminum compound to be used as a cocatalyst for the above-mentioned titanium-cotaining solid catalyst component is a compound of the formula $AlR_nX_{3-n}$ wherein $R^5$ is a hydrocarbon group having from 1 to 20 carbon atoms, X is a halogen atom, and n is a number satisfying $3 \geq n > 1.5$. When the titanium-containing solid catalyst component is a carrier-supported type catalyst component containing a solid magnesium compound, it is preferred to employ $AlR_3$ or a mixture of $AlR_3$ and $AlR_2X$.

Whereas, when the titanium-containing solid catalyst component is the one composed essentially of titanium trichloride, it is preferred to employ $AlR_2X$. It is particularly preferred to employ diethylaluminum chloride di-n-propylaluminum chloride, dihexylaluminum chloride or di-n-octylaluminum chloride. The above-mentioned titanium trichloride and organoaluminum compound are used in a molar ratio of the organoalumnium compound to the titanium trichloride within a range of from 1 to 30, preferably from 2 to 15.

In the present invention, the above catalyst may be used as it is. However, as pretreatment, it is preferred to preliminarily polymerize a small amount of an α-oefin to the catalyst comprising the titanium trichloride and the organoaluminum compound. This method may be conducted in such a manner that titanium trichloride and an organoaluminum compound are added to an inert solvent such as hexane, heptane, and then an α-olefin such as propylene or ethylene or butene-1, or a mixture thereof may be supplied thereto for polymerization. This pretreatment is a so-called preliminary polymerization, and a conventional condition for pre-polymerization may be employed as it is, as the pre-polymerization condition. The pre-polymerization temperature is preferably from 30° to 70° C. The higher the polymerization degree per unit weight of titanium trichloride, the better. However, it is usually within a range of from 0.1 to 100 g/g-TiCl$_3$ from the economical viewpoint or from the viewpoint of apparatus. At the time of the preliminary polymerization, a molecular weight modifier such as hydrogen may be added. Further, the preliminary polymerization is preferably conducted uniformly by a batch system. This preliminary polymerization is effective for an improvement of the nature of the polymer (particle) such as the bulk density.

Further, an additive for the improvement of stereo-regularity may be incorporated as a third component to the catalyst comprising the above-mentioned titanium trichloride and organoaluminum compound. For this purpose, the various compounds containing N, O, P, or Si, or a hydrocarbon compound may be used. Such a third component is added usually in an amount of from 0.0001 to 5 mol, preferably from 0.001 to 1 mol, per mol of titanium trichloride.

The main polymerization of propylene in the first step can be conducted by a conventional polymerization method such as slurry polymerization or gas phase polymerization. Such a polymerization can be conducted in either a batch system or a continuous system. The reaction is conducted usually under a pressure of from 1 to 100 atm, preferably from 5 to 40 atm at a temperature within a range of from 50° to 90° C., preferably from 60° to 80° C. In the case of the slurry polymerization, an inert hydrocarbon solvent commonly employed for olefin polymerization, such as an aliphatic hydrocarbon, an alicyclic hydrocarbon or an aromatic hydrocarbon may be employed as the polymerization medium. Particularly preferred is n-hexane, h-heptane, cyclohexane, benzene or toluene. It is also possible to use propylene itself as the solvent.

As a molecular weight modifier for the resulting polymer, a conventional molecular weight modifier such as hydrogen or diethyl zinc may suitably added for the polymerization reaction.

For the polymerization in the first step of the present invention, propylene may be used alone. Otherwise, propylene and other α-olefin may be used in combination. Such other α-olefin is an α-olefin such as ethylene, butene-1 or 4-methylpentene-1. The amount should be small so that the product maintains the properties as a propylene polymer. For example, the amount is preferably not higher than 10% by weight, relative to propylene.

The propylene polymer thus obtained is transferred to a gas phase polymerization reactor without deactivating the catalyst contained therein after removing a part of the reaction medium or without such removal. Namely, when the polymer is obtained by a solvent polymerization method, the inert hydrocarbon and the unreacted monomer are removed by a centrifugal separator, a liquid cyclone or a flushing apparatus for separation by evaporation. Whereas, when liquid propylene itself is used as the medium, it may be supplied to the gas phase polymerization reactor without conducting solid-liquid separation, although the above-mentioned conventional solid-liquid separation may, of course, be conducted.

The most important feature of the present invention is that when the propylene polymer obtained by the above-mentioned process is polymerized in a gas phase with an α-olefin other than propylene, alone or together with propylene, the polymerization is conducted in the presence of a siloxane or a polysiloxane, whereby an extremely high polymerization activity is obtainable, and the powder property of the polymer is improved, particulary the bulk density of the powder is improved, and it is possible to obtain a block copolymer powder having excellent flowability which is free from adhesion of polymer particles. The polysiloxane to be used in the present invention is a polysiloxane having a chain, cyclic or spiro structure. Namely, it is a silicon compound having a repeating unit of the formula:

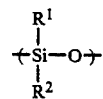

wherein each of $R^1$ and $R^2$ is a hydrogen atom, an alkyl group having from 1 to 20 carbon atoms, aryl, alkoxy or aryloxy group or a halogen atom, and a degree of polymerization of from 2 to 3,000.

Specifically, it includes an alkylsiloxane polymer such as octamethyltrisiloxane, octaethylcyclotetrasiloxane$[Si(C_2H_5)_2O]_4$, dimethylpolysiloxane$[Si(CH_3)_2O]_m$ or methylethyl polysiloxane$[Si(CH_3)(C_2H_5)_2O]_m$; an arylsiloxane polymer such as hexaphenylcyclotrisiloxane$[Si(C_6H_5)_2O]_3$ or diphenylpolysiloxane$[Si(C_6H_5)_2O]_m$; an alkylarylsiloxane polymer such as diphenylhexamethyltetrasiloxane $(CH_3)_3SiO[Si(C_6H_5)_2O]_2\text{-}Si(CH_3)_3$ or methylphenylpolysiloxane$[Si(CH_3)(C_6H_5)O]_m$; a haloalkylsiloxane such as 1,7-dichloroctamethyltetrasiloxane $(CH_3)_2ClSiO[Si(CH_3)_2O]_2Si(CH_3)_2Cl$; an alkoxysiloxane polymer such as dimethoxypolysiloxane$[Si(OCH_3)_2]_m$ or diethoxypolysiloxane$[Si(OC_2H_5)_2]_m$; and an organopolysiloxane such as a diphenoxypolysiloxane polymer. Here, m is a number of from 2 to 3,000.

Further, as the polysiloxane of the present invention, a compound commonly referred to as silicone oil may be used. Commercially available silicone oils having a viscosity of from 0.5 to $2\times10^6$ centistokes and a mixture thereof may preferably be employed. Specifically Shin-etsu Silicone KF50, KF54, KF69, KF96, and KF99 (trade names, manufactured by Shin-etsu Chemical Co., Ltd.), may be mentioned.

As the siloxane, hexamethyldisiloxane may be mentioned.

The siloxane or polysiloxane (hereinafter simply referred to as a polysiloxane) is added usually after the completion of the propylene polymerization of the first step. However, since such a polysiloxane does not adversely affect the propylene polymerization of the first step, it may be added to the polymerization reactor of the first step from the very beginning. In such a case, the polysiloxane may be supplied during the polymerization in the case of a batch system polymerization. Otherwise, when the propylene polymerization in the first step is conducted in a multi-tank system in the case of continuous system, the polysiloxane may be supplied to any tank so long as it is a propylene polymerization tank in the first step. In the case where the polysiloxane is added after the completion of the polymerization of propylene in the first step, the addition may be made either prior to or after separating the solvent or propylene monomer from the propylene polymer.

For the addition of the polysiloxane, any optional method may be employed. For example, when the polysiloxane is added to the polymerization reactor in the first step, it may be added alone, or may be supplied together with a solvent, or with propylene or other α-olefin. Otherwise, it may be supplied in the form of a mixture with a catalyst or with a third component. When it is added to the polymerization reactor in the second step, it may be added directly to the reactor in a liquid state, or it may be supplied as dissolved and diluted with an inert hydrocarbon solvent or with liquid propylene.

Otherwise, the polysiloxane may be supplied directly or as dissolved and diluted with an inert hydrocarbon solvent or liquid propylene to the α-olefin gas other than propylene or to the gas mixture of propylene with other α-olefin, to be supplied to the gas phase polymerization reactor. Any one of the above-mentioned methods for the addition may be employed. However, it is preferred to employ a method wherein the polysiloxane is effectively added to the propylene polymer of the first step.

The amount of the polysiloxane is usually within a range of from $1\times10^{-6}$ to 0.1, preferably from $5\times10^{-6}$ to 0.01, more preferably from $1\times10^{-5}$ to 0.005, most preferably from $2\times10^{-5}$ to 0.001, by weight ratio relative to the weight of the propylene polymer obtained in the first step. Further, the polysiloxane is used in an amount of from 1 to $1\times10^5$% by weight, preferably from 5 to $1\times10^4$% by weight, more preferably from 10 to $5\times10^3$% by weight, most preferably from 20 to 1,000% by weight, relative to the weight of the solid catalyst.

If the amount of the polysiloxane is excessive, the polymer particles are likely to adhere to one another by the viscosity of the polysiloxane itself, such being undesirable. If the amount is too small, no adequate effects of the present invention will be obtained.

In a case where the polysiloxane is added to the polymerization reactor of the first step from the very beginning or the polysiloxane is added after the completion of the polymerization of propylene in the first step, and the separation of the polymer (solid-liquid separation) is conducted prior to the introduction of the propylene polymer to the gas phase polymerization reactor of the second step, the polysiloxane is preliminarily added in such an amount that the concentration thereof in the propylenepolymer introduced to the gas phase polymerization reactor has the above-mentioned concentration, or the polysiloxane is additionally supplied to the gas phase polymerization reactor.

Heretofore, Japanese Unexamined Patent Publication No. 86608/1984 proposes a method wherein the polymerization is conducted in the presence of silicone oil in an amount of less than 1% by weight relative to the weight of the solid catalyst, preferably from 50 to about 5,000 ppm to prevent formation of an outer skin in the reactor for the polymerization of an α-olefin in the presence of solid catalyst particles containing titanium and chlorine in a compound state. This method is effective for the prevention of the outer skin on the polymerization reactor, but does not provide any effects for improvement of the polymerization activity of the catalyst in the gas phase polymerization, or for the improvement of the powder property of the polymer, particulary for the improvement of the bulk density of the powder.

In the present invention, as the α-olefin other than propylene, polymerized or copolymerized in the gas phase, α-olefins having from 2 to 8 carbon atoms, preferably from 2 to 6, or a mixture thereof may be employed. More preferably, ethylene or a mixture of ethylene and propylnene, is preferably employed. The gas phase polymerization is conducted usually at a temperature of from 30° to 100° C. under a pressure of from 1 to 50 kg/cm², and the polymerization or copolymerization is conducted so that the polymerization ratio to the entire polymer will be from 3 to 50% by weight, preferably from 10 to 30% by weight. In a preferred embodiment wherein a gas mixture of ethylene and propylene is employed, the gas composition (propylene/(ethylene+propylene)) is from 10 to 90 mol %, preferably from 20 to 80 mol %.

The method of the present invention consists essentially of a first step of polymerizing propylene alone or together with a small amount of other α-olefin to obtain a propylene polymer, and a second step of conducting the gas phase polymerization of the propylene polymer with an α-olefin other than propylene, alone or together with propylene. However, also in the present invention, the gas phase polymerization of the second step can be conducted in a plurality of stages, whereby the polymerization temperature, the hydrogen concentration, the monomer composition and the reaction ratio may be varied among the respective reactors. When the gas phase polymerization is conducted in a plurality of steps, the polysiloxane may be added to any one of the steps.

In the present invention, the apparatus to be used for the gas phase polymerization of the second step is not particulary limited, and conventional apparatus such as a fluidized bed, an agitation tank, a fluidized bed equipped with a stirrer or a mobile bed, may be preferably employed. The polymerization may be conducted continuously or in a batch system.

After the completion of the gas phase polymerization, the polymer withdrawn continuously or intermittently, may if necessary, be subjected to inactivating treatment with an alkylene oxide, an alcohol or hydrogen, to deashing treatment or to the removal of a non-crystalline polymer with a solvent.

The first feature of the method of the present invention is the polymerization activity in the gas phase polymerization can be substantially improved, which is most preferred for the gas phase polymerization. Secondly, the powder properties are substantially improved, and the bulk density of the powder is improved and the adhesion of the polymer to the inner wall of the reactor or to the stirrer is prevented, whereby a safe operation is insured. Thirdly that irrespective of the amount of the polysiloxane, the amount of the non-crystalline polymer formed in the first step or in the gas phase polymerization does not vary, i.e. the amount of the formed polymer soluble by boiling n-hexane extraction does not change whether the polysiloxane is present or absent, and it is thereby possible to obtain a block copolymer having good powder properties. Fourthly, the molecular weight of the polymer polymerized in the first step or in the gas phase does not vary. Fifthly, the composition of the resulting polymer does not change at all. For example, in the case of a propylene-ethylene copolymer, the continuous long chain distribution of ethylene-propylene as evaluated by $^{13}C$-NMR does not vary whether or not the polysiloxane is added.

As described in the foregoing, according to the method of the present invention, the gas phase polymerization of the second step can be conducted at an extremely high activity without bringing about an adverse phenomenon such as adhesion and while maintaining flowability, and it is thereby possible to obtain a block copolymer having excellent powder properties and impact resistance. Particulary in the case of a continuous process, the withdrawal of the block copolymer can be conducted smoothly, whereby a product having stabilized quality can be obtained.

Now, the present invention will be described with reference to Examples. However, it should be understood that the present invention is by no means restricted to such specific Examples. In the following Examples and Comparative Examples, the bluk density, the angle of repose, the n-hexane extraction residue and the activity were measured in accordance with the following methods.

(1) Measurement of the bluk density
According to JIS-K-6721
(2) Angle of repose

By using an angle of repose tester by Miwa type cylinderical rotational method, manufacured by Tsutsui Rica Kagaku Kiki K.K., the angle of repose during the rotation was measured.

(3) n-Hexane extraction residue

The amount of residue (% by weight) when the product was extracted with boiling n-hexane for 3 hours by a modified soxhlet extractor.

(4) Activity

Catalyst efficiency: CE

The total production of the propylene polymer produced per 1 g of titanium trichloride catalyst component (g-polymer/g-$TiCl_3$)

Activity

Catalyst efficiency per unit time (g-polymer/g-$TiCl_3$.hr)

EXAMPLE 1

(A) Preparation of solid titanium trichloride

Into a 1 liter flask thoroughly flushed with nitrogen at room temperature, 500 ml of purified toluene was introduced, and 65.1 g (0.5 mol) of n-butyl ether, 94.9 g (0.5 mol) of titanium tetrachloride and 28.6 g (0.25 mol) of diethylaluminum chloride were added under stirrng to obtain a brown uniform solution.

Then, the temperature was raised to 40° C., and upon expiration of 30 minutes, precipitation of purple colored fine particulate solid was observed, and the system was maintained under the same condition at 40° C. for 2 hours. Then, the system was maintained at 96° C. for about 1 hour, and the particulate purple solid was separated and washed with n-hexane to obtain about 80 g of solid titanium trichloride.

(B) Preparation of titanium trichloride containing a propylene polymer

Into a 500 ml flask thoroughly flushed with nitrogen, 250 ml of purified n-hexane was introduced, and 1.9 g of diethylaluminum chloride and the solid titanium trichloride obtained in the above (A) in an amount of 2.5 g (0.016 mol) as $TiCl_3$, were charged. While maintaining the temperature at 40° C., 12.5 g of propylene gas was blown into the gas phase under stirring for about 10 minutes for catalytic treatment.

Then, the system was left to stand still for sedimentation of the solid component, and the supernatant was removed by decantation, and the solid component was washed a few times with n-hexane to obtain a propylene polymer-containing solid titanium trichloride.

(C) Preparation of a propylene block copolymer

Into a 2 liter induction stirring type autoclave flushed with dry nitrogen, 1.3 mmol of diethylaluminum monochloride as a cocatalyst, 1.2 kg/cm² of hydrogen gas and 700 g of liquefied propylene were charged.

The autoclave was heated to 70° C., the propylene polymer-containing titanium trichloride obtained in the above step (B) was introduced in an amount of 25 mg as $TiCl_3$ with nitrogen to initiate polymerization.

Upon expiration of 3 hours, unreacted propylene was immediately purged, and 20 g of the polymer powder was sampled under an atmosphere of purified nitrogen.

Then, 0.08 kg/cm² of hydrogen gas was blown into this reactor. When the temperature reached 80° C., 0.35 g of Shin-etsu Silicone KF96, manufactured by Shin-etsu Chemical Co., Ltd. and a gas mixture of propylene and ethylene were supplied, and the gas phase polymerization reaction was continued for 36 minutes at 80° C. while maintaining the gas phase composition to be propylene/(propylene+ethylene)=65 mol % and the pressure at 15 kg/cm$^2$G. After completion of the reaction, unreacted monomer gas was purged to obtain 388 g of a powdery polypropylene block copolymer.

The catalytic efficiency (CE) from the analysis of the Ti content in the polymer by fluorescent X-rays, was 14,000 (g-PP/g-TiCl$_3$) with the sample obtained at the completion of the homopolymerization, and 16,470 (g-polymer/g-TiCl$_3$) with the final polymer product, and the catalyst efficiency for the copolymerization part by the gas phase polymerization was 2,470 (g-polymer/g-TiCl$_3$) and the activity was 4,140 (g-polymer/g-TiCl$_3$.hr).

Various test results are shown in Table 1.

EXAMPLES 2 and 3

The production of a propylene block copolymer was conducted in the same manner as in step (C) in Example 1 by using a propylene polymer-containing solid titanium trichloride obtained by the same polymerization as step (B) in Example 1 except that instead of Shin-etsu Silicone KF96, the polysiloxane as identified in Table 1 was added.

Various test results are shown in Table 1.

COMPARATIVE EXAMPLE 1

The production of a propylene block copolymer was conducted for 72 minutes in the same manner as in step (C) in Example 1 except that Shin-etsu Silicone KF96 was not used.

Catalyst efficiency was 13,600 (g-PP/g-TiCl$_3$) at the completion of the homopolymerization, and 16,000 (g-polymer/g-TiCl$_3$) with the final polymer product. The catalyst efficiency for the copolymerization part by the gas phase polymerization was 2,400 (g-polymer/g-TiCl$_3$), but the activity was 2,000 (g-polymer/g-TiCl$_3$.hr)

Various test results are shown in Table 1.

COMPARATIVE EXAMPLE 2

The gas phase polymerization was conducted at 80° C. for 35 minutes in the same manner as in Example 1 except that in step (C) in Example 1, instead of Shin-etsu Silicone KF96, a n-hexane solution of 0.2 mmol/liter of diethylaluminum monoethoxide was added in a molar ratio of 1.5 per 1 g atom of titanium trichloride contained in the propylene polymer used for the polymerization of the second step.

The catalyst efficiency was 13,900 (g-PP/g-TiCl$_3$) at the completion of the polymerization of the first step and 16,450 (g-polymer/g-TiCl$_3$) with the final polymer product. The catalyst efficiency for the copolymerization part by the gas phase polymerization was 2,550 (g-polymer/g-TiCl$_3$), and the activity was 4,370 (g-polymer/g-TiCl$_3$. hr).

The bulk density of the block copolymer thus obtained was 0.39 g/cc, and the n-hexane extaction residue was 94.0% by weight. The angle of repose was 50°. The results are shown in Table 1.

EXAMPLE 4

The gas phase polymerization was conducted at 80° C. for 30 minutes in the same manner as in Example 1 except that in step (C) in Example 1, the composition of the gas mixture supplied was changed to propylene/(propylene+ethylene)=40 mol %, and the amount of Shin-etsu Silicone KF96 added was changed to 0.07 g. The catalyst efficiency was 14,000 (g-PP/g-TiCl$_3$) at the completion of the homopolymerization and 17,000 (g-polymer/g-TiCl$_3$) with the final polymer product. The catalyst efficiency for the copolymerization part by the gas phase polymerization was 2,600 (g-polymer/g-TiCl$_3$), and the activity was 5,200 (g-polymer/g-TiCl$_3$.hr).

Various test results are shown in Table 1.

COMPARATIVE EXAMPLE 3

The gas phase polymerization was conducted at 80° C. for 57 minutes in the same manner as in Example 4 except that Shin-etsu Silicone KF96 was not added. The catalyst efficiency was 13,800 (g-PP/g-TiCl$_3$) at the completion of the homopolymerization and 16,250 (g-polymer/g-TiCl$_3$) with the final polymer product. The catalyst efficiency for the copolymerization part by the gas phase polymerization was 2,450 (g-polymer/g-TiCl$_3$), and the activity was 2,580 (g-polymer/g-TiCl$_3$.hr).

Various test results are shown in Table 1.

EXAMPLE 5

The gas phase polymerization was conducted at 80° C. for 30 minutes in the same manner as in Example 1 except that in step (C) in Example 1, ethylene was supplied alone instead of the gas mixture supplied, and the pressure was changed to 10 kg/cm$^2$G, and the amount of Shin-etsu Silicone KF96 added was changed to 0.07 g. The catalyst efficiency was 13,900 (g-PP/g-TiCl$_3$) at the completion of the homopolymerization, and 16,450 (g-polymer/g-TiCl$_3$) with the final polymer product. The catalyst efficiency for the portion of the ethylene polymer was 2,450 (g-polymer/g-TiCl$_3$), and the activity was 5,100 (g-polymer/g-TiCl$_3$.hr).

Various test results are shown in Table 1.

COMPARATIVE EXAMPLE 4

The gas phase polymerization was conducted at 80° C. for 60 minutes in the same manner as in Example 5 by supplying ethylene alone except that Shin-etsu Silicone KF96 was not added. The catalyst efficiency was 14,000 (g-PP/g-TiCl$_3$) at the completion of the propylene homopolymerization and 16,300 (g-polymer/g-TiCl$_3$) with the final polymer product. The catalyst efficiency for the portion of the ethylene polymer was 2,300 (g-polymer/g-TiCl$_3$), and the activity was 2,510 (g-polymer/g-TiCl$_3$.hr).

Various test results are shown in Table 1.

EXAMPLE 6

(A) In step (C) in Example 1, into an autoclave heated to 80° C. with an internal pressure being maintained at 5 kg/cm$^2$ with purified nitrogen while supplying purified nitrogen at a rate of 3 liter/min., the propylene slurry obtained by the polymerization of the first step was gradually supplied in small portions, and propylene was flush-purged.

After the completion of the supply and after flushing under a purified nitrogen atmosphere, 20 g of the polymer was sampled.

The polymer remained in the polymerization tank in the first step was 105 g.

(B) Then, 0.08 kg/cm$^2$ of hydrogen gas was blown into the autoclave to which the polymer was transferred, and 0.175 g of Shin etsu Silicone KF96 and a gas mixture of propylene and ethylene were supplied. The gas phase polymerization reaction was continued at 80° C. for 35 minutes while maintaining the gas composition of the gas phase to be propylene/(ethylene+- propylene)=65 mol % and the pressure at 15 kg/cm². The catalyst efficiency was 13,700 (g-PP/g-TiCl₃) at the completion of the homopolymerization and 16,100 (g-polymer/g-TiCl₃) with the final polymer product. The catalyst efficiency for the copolymerization part by the gas phase polymerization was 2,390 (g-polymer/g-TiCl₃). The activity was 4,100 (g-polymer/g-TiCl₃.hr).

Various test results are shown in Table 1.

EXAMPLE 7

In the same manner as in step (A) in Example 6, the propylene polymer slurry from the first step was portionwise supplied to the polymerization tank for the second step. After purging propylene by flushing, 28 g of the polymer containing no propylene was sampled under a purified nitrogen atmosphere.

The polymer remaining in the polymerization tank of the first step was 107 g.

Then, the gas phase polymerization reaction was continued at 80° C. for 35 minutes in the same manner as in step (B) in Example 6 except that the addition of Shin-etsu Silicone KF96 in step (B) in Example 6 was changed to the addition of 0.01 g of Shin-etsu Silicone KF54.

The results are shown in Table 1.

COMPARATIVE EXAMPLE 5

The production of a propylene block copolymer was conducted for 75 minutes in the same manner as in Example 6 except that Shin-etsu Silicone KF96 was not added.

The catalyst efficiency was 13,900 (g-PP/g-TiCl₃) at the completion of the homopolymerization and 16,100 (g-polymer/g-TiCl₃) with the final polymer product. The catalyst efficiency for the copolymerization part by the gas phase polymerization was 2,200 (g-polymer/g-TiCl₃), and the activity of the gas phase polymerization was 1,760 (g-polymer/g-TiCl₃.hr)

Various test results are shown in Table 1.

EXAMPLE 8

(A) Preparation of a solid titanium trichloride catalyst component

Into a 100 liter autoclave thoroughly flushed with nitrogen, 50 liters of toluene, 50 mol of titanium tetrachloride and 50 mol of di-n-butyl ether were added. While maintaining the mixture at 25° C. under stirring, 25 mol of diethylaluminum chloride was added to obtain a brown uniform solution.

Then, the temperature was raised to 40° C., and upon expiration of 30 minutes, precipitation of purple colored fine particulate solid was observed, and the system was maintained under the same condition at 40° C. for 2 hours.

Then, the temperature was raised to 96° C., and the system was maintained for about 1 hour, and then the particulate purple solid was separated and washed with n-hexane to obtain about 8,000 g of solid titanium trichloride.

Then, into a 200 liter autoclave thoroughly flushed with nitrogen, 125 liters of n-hexane was charged, and 16 mol of di-n-propylaluminum chloride and the above solid titanium trichloride catalyst complex in an amount of 2,500 g as TiCl₃, were charged under stirring. Then, the internal temperature was adjusted to 30° C., and propylene gas was blown thereinto under stirring. The supply of propylene gas at the same temperature was continued until polypropylene reached 12,500 g. Then, solid was separated and repeatedly washed with n-hexane to obtain a polypropylene-containing titanium trichloride (titanium-containing solid catalyst component).

(B) Preparation of a propylene-ethylene block copolymer

An apparatus in which a reactor having a capacity of 1,500 liters equipped with a stirrer and a gas phase reactor having a capacity of 700 liters equipped with a spiral stirrer were connected in series, was employed. In the first polymerization tank, polypropylene was prepared by a liquid phase bulk polymerization of propylene. The polymerization tank was operated at a liquid level of 800 liters, and propylene, hydrogen, the catalyst, the cocatalyst and the third component were respectively continuously supplied in the predetermined proportions to the polymerization tank. 2.5 g/hr. of the titanium trichloride catalyst obtained in the above step (A) as the catalyst, 9.8 g/hr. of diethylaluminum chloride as the cocatalyst, 20 g/hr. of hydrogen as the molecular weight modifier, 0.33 g/hr. of methyl methacrylate as the third component, were supplied. The polypropylene was continuously produced in liquid propylene at a polymerization temperture of 70° C. for a retention time of 3 hours under the condition such that the gas composition of the gas phase (hydrogen/propylene) was 5 mol %. To the gas phase polymerization tank for the second step, the polypropylene slurry obtained in the first polymerization tank was continuously supplied, and a gas mixture of hydrogen, ethylene and propylene was circulated under control so that the composition of the propylene/(propylene+ethylene) was 65 mol %, the composition of hydrogen/(propylene+ethylene) was 1 mol %, and the internal pressure of the reactor was 10 kg/cm²G.

The temperature was adjusted by the temperature of the circulating gas mixture so that the interior of the gas phase polymerization reactor became 70° C. In this gas phase polymerization reactor, the retained amount was controlled so that the retention time of the polymer became 1.2 hours, and the polymer was continuously withdrawn to obtain the copolymer in a powder form.

Into the gas mixture introduced into the gas phase polymerization reactor, Shin-etsu Silicone KF96 diluted with n-hexane was supplied so that the amount of Shin-etsu Silicone KF96 became 100 ppm relative to the propylene polymer.

In this manner, the continuous operation was conducted for 60 days. During this period, no adhesion trouble was observed, and the operation was conducted under a sound condition. After the completion of the operation, the gas phase reactor was opened and inspected, whereby no adhesion to the wall of the reactor was observed.

The typical values such as the activity during the continuous operation are shown below and in Table 2. The catalyst efficiency for the polymer in the first step was 13,500 (g-PP/g-TiCl₃), and the catalyst efficiency for the block copolymer after the gas phase polymerization was 15,880 (g-polymer/g-TiCl₃). The catalyst efficiency for the gas phase polymerization alone was 2,380 (g-polymer/g-TiCl₃), and the activity was 1,980 (g-polymer/g-TiCl₃ hr). The properties of the block copolymer thus obtained was excellent, and the bulk density was 0.48 g/cc, the angle of repose was 40°, and the n-hexane extraction residue was 97.6% by weight.

The results are shown in Table 2.

COMPARATIVE EXAMPLE 6

The continuous polymerization was conducted in the same manner as in step (B) in Example 8 by using the solid titanium trichloride catalyst component obtained in the same manner as in step (A) in Example 8 except that Shin-etsu Silicone KF96 used in step (B) in Example 8 was not added. In this case, the catalyst efficiency for the polymer in the first step was 13,600 (g-PP/g-TiCl$_3$), and the catalyst efficiency for the polymer after the gas phase polymerization was 14,620 (g-polymer/g-TiCl$_3$) The catalyst efficiency for the gas polymerization alone was 1,020 (g-polymer/g-TiCl$_3$), and the activity was 850 (g-polymer/g-TiCl$_3$.hr) Namely, the polymerization rate in the gas phase polymerization reactor was not adequate, whereby the desired ethylene-propylene copolymer content was not obtained.

The results are shown in Table 2.

COMPARATIVE EXAMPLE 7

The continuous polymerization was conducted in the same manner as in Example 8 except that instead of Shin-etsu Silicone KF96 used in Example 8, diethylaluminum monoethoxide was diluted with n-hexane in the same manner as in step (B) in Example 8 to bring its concentration to the same molar ratio per 1 g atom of titanium tirchloride as supplied to silicon oil, and supplied to the gas mixture at a rate of 1 liter/hr.

As a result, on the third day after the initiation of the continuous polymerization, the driving force for the stirrer of the gas phase polymerization reactor increased sharply and the continuous operation became impossible. After the completion of the operation, the interior of the gas phase reactor was inspected, whereby a deposition of a bulky polymer on the stirring vanes and on the wall of the reactor was observed.

The typical values obtained until the termination of the operation were as follows. The catalyst efficiency for the polymerization in the first step was 13,600 (g-PP/g-TiCl$_3$), and the catalyst efficiency for the polymer after the gas phase polymerization was 16,050 (g-polymer/g-TiCl$_3$). The catalyst efficiency for the gas phase polymerization only was 2,450 (g-polymer/g-TiCl$_3$), and the activity was 2,040 (g-polymer/g-TiCl$_3$.hr).

The bulk density of the block copolymer thus obtained was 0.40 g/cc, the angle of repose was 49°, and the n-hexane extraction residue was 93.5% by weight.

The results are shown in Table 2.

EXAMPLE 9

In step (C) in Example 1, into a 2 liter induction stirring type autoclave flushed with dry nitrogen, 1.3 mmol of diethylaluminum monochloride as the cocatalyst, 0.2 mmol of methyl methacrylate as the third component, 0.35 g of Shin-etsu Silicone KF96, manufactured by Shin-etsu Chemical Co. Ltd., 1.2 kg/cm$^2$ of hydrogen gas and 700 g of liquefied propylene were charged. The autoclave was heated, and when the temperature reached 70° C., the propylene polymer-containing solid titanium trichloride obtained in the step (B) in Example 1 was introduced in an amount of 25 mg as TiCl$_3$ with nitrogen, to initiate the polymerization.

Three hours later, unreacted propylene was immediately purged, and 50 g of the polymer powder was sampled under a purified nitrogen atmosphere.

Then, 0.08 kg/cm$^2$ of hydrogen gas was blown into this reactor, and when the temperature reached 80° C., a gas mixture of propylene and ethylene was supplied, and the gas phase polymerization reaction was continued at 80° C. for 35 hours while maintaining the gas composition of the gas phase to be propylene/(propylene+ethylene)=65 mol % and the pressure at 15 kg/cm$^2$G.

After the completion of the reaction, unreacted monomer gas was purged, and 348 g of a powder polypropylene block copolymer was obtained.

The polymer obtained in the first step had a bulk density of 0.46 (g/cc), the n-hexane extraction residue was 99.3 (% by weight), and the angle of repose was 34°.

The silicone atom contained in the block copolymer was analyzed by a molybdenum blue method, whereby it was detected at a concentration of 305 ppm.

The bulk density of the block copolymer obtained was 0.45 (g/cc), the n-hexane extraction residue was 97.8 (% by weight), and the angle of repose was 40°.

From the analysis of the Ti content in the polymer by fluorescent X-rays, the catalyst efficiency was 13,900 (g-PP/g-TiCl$_3$) at the completion of the homopolymerization and 16,300 (g-polymer/g-TiCl$_3$) with the final polymer product. The catalyst efficiency for the copolymerization part by the gas phase polymerization was 2,400 (g-polymer/g-TiCl$_3$), and the activity was 4,110 (g-polymer/g-TiCl$_3$. hr).

EXAMPLES 10 and 11

The production of a propylene block copolymer was conducted in the same manner as in Example 9 except that the polysiloxane as identified in Table 3 was added instead of Shin-etsu Silicone KF96 in step (C) in Example 9.

The results are shown in Table 3.

COMPARATIVE EXAMPLE 8

The production of a propylene block copolymer was conducted in the same manner as in step (C) in Example 9 except that Shin-etsu Silicone KF96 was not used.

The results are shown in Table 3.

As is evident from the results in Table 3, in the case where a polysiloxane was added in the first step, the activity in the gas phase polymerization was substantially improved without affecting the activity, the molecular weight control, the stereoregularity and the powder properties in the polymerization in the first step and the stereoregularity in the gas phase polymerization.

EXAMPLE 12

The production of a propylene-block copolymer was conducted in the same manner as in Example 9 except that ethylene was supplied alone instead of the gas mixture of ethylene and propylene supplied in step (C) in Example 9, and the pressure was changed to 10 kg/cm$^2$G and the amount of Shin-etsu KF96 added was changed to 0.07 g.

The results are shown in Table 3.

COMPARATIVE EXAMPLE 9

The production of a propylene-block copolymer was conducted in the same manner as in Example 12 by supplying ethylene alone except that the polysiloxane was not added.

The results are shown in Table 3.

EXAMPLE 13

(A) In step (C) in Example 9, the polysiloxane added was changed to Shin-etsu Silicone KF54, and into an autoclave heated to 80° C. with the internal pressure maintained at 5 kg/cm² with purified nitrogen while supplying purified nitrogen at a rate of 3 liter/min., the polypropylene slurry after the completion of the polymerization in the first step was gradually supplied in small portions, and propylene was flush-purged.

After the completion of the supply, and after flushing under a purified nitrogen atmosphere, 35 g of the polymer was sampled. The polymer remained in the polymerization tank in the first step was 84 g.

(B) Then, 0.08 kg/cm² of hydrogen gas was blown into the autoclave to which the polymer was transferred, and a gas mixture of propylene and ethylene was supplied, and the production of a propylene-block copolymer was conducted by a gas phase polymerization while maintaining the gas composition to be propylene/(ethylene+propylene)=65 mol % and the pressure at 15 kg/cm².

The results are shown in Table 3.

COMPARATIVE EXAMPLE 10

The production of a propylene-block copolymer was conducted in the same manner as in Example 13 except that Shin-etsu Silicone KF54 was not added.

The results are shown in Table 3.

EXAMPLE 14

Continuous polymerization for a propylene-ethylene block compolymer

Two reactors equipped with a stirrer having an internal capacity of 1,000 liters and 400 liters, respectively, were connected in series, and one gas-phase polymerization reactor of an agitation fluidized bed type having a capacity of 1,500 liters was connected thereto. In the first and second reactors, homopolymerization of propylene was conducted in liquefied propylene, and in the third reactor, copolymerization of propylene and ethylene with the polypropylene was conducted continuously in a gas phase. To the first reactor, liquefied propylene, 4.0 g/hr. of the catalyst component obtained in the same manner as in Example 1, 10 g/hr. of diethylaluminum chloride as a cocatalyst, 0.52 g/hr. of methyl methacrylate and 15 g/hr. of hydrogen as a molecular weight modifier, were continuously supplied.

The polymerization temperature was 70° C. in the first reactor and 67° C. in the second reactor. A slurry was continuously withdrawn from the first reactor and supplied to the second reactor. The average retention time was 4.0 hours as a total period of retention time in the first and second reactors.

A polymer slurry from the second reactor was continuously supplied to the third reactor, where the gas-phase polymerization was conducted at a temperature of 60° C. under a pressure of 9.0 kg/cm².G. The composition of ethylene and propylene in the gas-phase was adjusted to be propylene/(ethylene+propylene)=65 mol %, and hydrogen/(ethylene+propylene)=15 mol %. To the circulation gas for the gas-phase polymerization, 4.5 g/hr. of Silicone Oil KF96 (CS-20; viscosity (25° C.): 20 centistokes) manufactured by Shin-etsu Chemical Co., Ltd., was supplied.

The average retention time in this gas phase reactor was 2.0 hours.

The polymer powder continuously withdrawn from the third reactor was separated from unreacted gas, and then treated with a vapor of propylene oxide to obtain a powdery polymer at a rate of 45 kg/hr. The ratio of the propylene homopolymer portion to the propylene-ethylene copolymer portion in the polymer thus obtained was 86/14. The bulk density of the powder was 0.46 g/cc, and the n-hexane extraction residue was 97.5% by weight.

The operation was continuously carried out for 14 days, during which the operation throughout the system was under a stabilized condition. After the completion of the operation, the reactors were opened, whereby no adhesion of a polymer or no agglomerate was observed in the reactors.

As compared with a Comparative Example wherein no silicone oil was supplied, the activity of the gas-phase polymerization was found to be improved remarkably i.e. by about twice, and the powder properties were found to be excellent.

COMPARATIVE EXAMPLE 11

A propylene-ethylene block copolymer was continuously produced in the same manner as in Example 14 except that no silicone oil was supplied in the gas-phase polymerization system.

In this case, however, the activity in the gas-phase polymerization portion was low, and it was necessary to raise the pressure for the gas-phase polymerization to a level of 15 kg/cm².G and to prolong the retention time to a level of 2.5 hours, to obtain the same composition as in Example 14 i.e. the ratio of the propylene homopolymer portion to the propylene-ethylene copolymer portion=86/14.

Further, the bulk density of the polymer powder thus obtained was 0.42 g/cc. The n-hexane extraction residue was 97.4% by weight.

After the continuous operation for 14 days, the reactor was opened and inspected, whereby an adhesion of a polymer was observed partly on the inner wall of the reactor and on the stirring vanes.

EXAMPLE 15

(A) Preparation of a carrier-supported type catalyst

Into a 300 ml flask thoroughly flushed with dry nitrogen, 5.0 g of Mg(OC$_2$H$_5$)$_2$, 7.4 g of Ti(OC$_4$H$_9$)$_4$ and 4.6 g of Si(OC$_2$H$_5$)$_4$ were introduced and reacted at 130° C. for 1 hour. Then, 8.2 g of phenol LC$_6$H$_5$OH) diluted with 8 ml of toluene, was added thereto, and the reaction was continued at 130° C. for 1 hour, whereby formation of a solid product was observed. Then, 80 ml of toluene, 25 g of TiCl$_4$ and 1.3 g of ethyl benzoate were added to this system, and the mixture was treated at 80° C. for 1 hour and then washed three times with toluene. Then, 83 g of TiCl$_4$ and 1.3 g of ethyl benzoate were again added, and the mixture was treated at 80° C. for 1 hour and finally thoroughly washed with toluene to obtain a carrier-supported type solid catalyst. The amount of Ti supported was 2.5% by weight.

(B) Preparation of a propylene-ethylene block copolymer

Into a 2 liter induction stirring type autoclave flushed with dry nitrogen, 0.78 mmol of triethylaluminum as a cocatalyst, 0.24 mmol of methyl p-methylbenzoate as a third component, 0.6 kg/cm² of hydrogen gas and 700 g of liquefied propylene were charged. The autoclave was heated, and when the temperature reached 70° C., 15 mg of the carrier-supported type solid catalyst obtained in the above step (A) was introduced to initiate the polymerization reaction. While maintaining the temperature at 70° C., this polymerization reaction was continued for 1 hour. Then, unreacted propylene was immediately purged, and 40 g of the polymer was sampled under a purified nitrogen atmosphere.

Then, to this reactor, 0.070 g of Silicone Oil KF96 (CS-20) manufactured by Shin-etsu Chemical Co., Ltd. was added, and the temperature was raised to 60° C. Then, hydrogen gas and a gas mixture of propylene and ethylene were introduced, and propylene-ethylene copolymerization was continued for 40 minutes under the gas-phase atmosphere. During the period, the gas-phase composition was controlled to be propylene/(ethylene+propylene)=65 mol %, and hydrogen/(ethylene+propylene)=0.7 mol %, and the pressure was controlled to be at a level of 10 kg/cm$^2$.G.

After the completion of the reaction, unreacted monomer gas was purged, to obtain 210 g of a powdery polypropylene block copolymer. The weight ratio of the propylene homopolymer portion to the propylene-ethylene copolymer portion in the copolymer thus obtained, was 85/15.

COMPARATIVE EXAMPLE 12

Propylene-ethylene block copolymerization was conducted in the same manner as in Example 15 except that no silicone oil was added to the propylene-ethylene gas-phase copolymerization system, whereby 200 g of a powdery polymer was obtained.

However, the activity in the second step of the propylene-ethylene gas-phase copolymerization portion, was low, and the weight ratio of the propylene homopolymer portion to the propylene-ethylene copolymer portion in the block copolymer thus obtained, was 91/9.

The polymerization activity for the copolymerization portion in the gas-phase was 1,500 g-polymer/g-catalyst in this Comparative Example, whereas the corresponding polymerization activity in Example 15 was 2,600 g-polymer/g-catalyst.

TABLE 1

| | | Example 1 | Example 2 | Example 3 | Comparative Example 1 | Comparative Example 2 | Example 4 |
|---|---|---|---|---|---|---|---|
| 1st step polymerization | Catalyst efficiency (g-PP/g-TiCl$_3$) | 14,000 | 13,800 | 13,900 | 13,600 | 13,900 | 14,000 |
| | Formed polymer (g) | 350 | 345 | 348 | 353 | 348 | 350 |
| 2nd step polymerization | Polymer subjected to polymerization (g) | 330 | 320 | 318 | 328 | 317 | 320 |
| | Added polysiloxane or R$_2$Al(OR) | | | | | | |
| | Name | Shin-etsu Silicone KF96 (*1) | Shin-etsu Silicone KF99 (*2) | Shin-etsu Silicone KF54 (*3) | — | Diethylaluminum monoethoxide | Shin-etsu Silicone KF96 |
| | Amount (g) | 0.35 | 0.35 | 0.35 | — | 0.029 | 0.07 |
| | Concentration (ppm) | 1,061 | 1,094 | 1,100 | — | 91 | 219 |
| | Polymerization time (min) | 36 | 35 | 35 | 72 | 35 | 30 |
| | Catalyst efficiency (g-polymer/g-TiCl$_3$) | 2,470 | 2,400 | 2,380 | 2,400 | 2,550 | 2,600 |
| | Activity (g-polymer/g-TiCl$_3$ · hr) | 4,140 | 4,110 | 4,080 | 2,000 | 4,370 | 5,200 |
| Block copolymer | Bulk density (g/cc) | 0.45 | 0.45 | 0.44 | 0.45 | 0.39 | 0.45 |
| | Angle of repose (degree) | 40 | 39 | 41 | 40 | 50 | 37 |
| | n-Hexane extraction residue (wt %) | 97.5 | 97.7 | 97.5 | 97.6 | 94.0 | 98.9 |

| | | Comparative Example 3 | Example 5 | Comparative Example 4 | Example 6 | Example 7 | Comparative Example 5 |
|---|---|---|---|---|---|---|---|
| 1st step polymerization | Catalyst efficiency (g-PP/g-TiCl$_3$) | 13,800 | 13,900 | 14,000 | 13,700 | 14,000 | 13,900 |
| | Formed polymer (g) | 345 | 348 | 350 | 343 | 350 | 348 |
| 2nd step polymerization | Polymer subjected to polymerization (g) | 315 | 322 | 320 | 218 | 215 | 220 |
| | Added polysiloxane or R$_2$Al(OR) | | | | | | |
| | Name | — | Shin-etsu Silicone KF96 | — | Shin-etsu Silicone KF96 | Shin-etsu Silicone KF96 | — |
| | Amount (g) | — | 0.07 | — | 0.175 | 0.01 | — |
| | Concentration (ppm) | — | 217 | — | 803 | 47 | — |
| | Polymerization time (min) | 55 | 30 | 60 | 35 | 35 | 75 |
| | Catalyst efficiency (g-polymer/g-TiCl$_3$) | 2,450 | 2,450 | 2,300 | 2,390 | 2,000 | 2,200 |
| | Activity (g-polymer/g-TiCl$_3$ · hr) | 2,580 | 5,100 | 2,510 | 4,100 | 3,430 | 1,760 |
| Block copolymer | Bulk density (g/cc) | 0.45 | 0.45 | 0.45 | 0.45 | 0.45 | 0.45 |
| | Angle of repose (degree) | 37 | 37 | 37 | 39 | 40 | 39 |
| | n-Hexane extraction residue (wt %) | 98.8 | 99.4 | 99.3 | 97.7 | 97.8 | 98.0 |

TABLE 2

|  |  | Example 8 | Comparative Example 6 | Comparative Example 7 |
|---|---|---|---|---|
| 1st step polymerization |  Catalyst efficiency (g-PP/g-TiCl$_3$) | 13,500 | 13,600 | 13,600 |
| 2nd step polymerization | Polymer subjected to polymerization (g) | 34 | 34 | 34 |
|  | Added polysiloxane or R$_2$Al(OR) |  |  |  |
|  | Name | Shin-etsu Silicone KF96 | — | Diethylaluminum monoethoxide |
|  | Amount (g) | 0.68 | — | 2.1 |
|  | Concentration (ppm) | 200 | — | 620 |
|  | Polymer retention time (min) | 1.2 | 1.2 | 1.2 |
|  | Catalyst efficiency (g-polymer/g-TiCl$_3$) | 2,380 | 1,020 | 2,450 |
|  | Activity (g-polymer/g-TiCl$_3$ · hr) | 1,980 | 850 | 2,040 |
| Block copolymer | Bulk density (g/cc) | 0.48 | 0.48 | 0.40 |
|  | Angle of repose (degree) | 40 | 36 | 49 |
|  | n-Hexane extraction residue (wt %) | 97.6 | 98.3 | 93.5 |

TABLE 3

|  |  | Example 9 | Example 10 | Example 11 | Comparative Example 8 |
|---|---|---|---|---|---|
|  | Added polysiloxane |  |  |  |  |
| 1st step polymerization | Name | Shin-etsu Silicone KF96 (*1) | Shin-etsu Silicone KF99 (*2) | Shin-etsu Silicone KF54 (*3) | — |
|  | Amount (g) | 0.35 | 0.35 | 0.35 | — |
|  | Catalyst efficiency (g-PP/g-TiCl$_3$) | 13,900 | 14,000 | 13,850 | 14,100 |
|  | Bulk density (g/cc) | 0.46 | 0.46 | 0.46 | 0.46 |
|  | Angle of repose (degree) | 34 | 32 | 33 | 32 |
|  | n-Hexane extraction residue (wt %) | 99.3 | 99.2 | 99.3 | 99.3 |
| 2nd step polymerization | Polymer subjected to polymerization (g) | 297 | 295 | 293 | 328 |
|  | Polymerization time (min) | 35 | 37 | 35 | 72 |
|  | Catalyst efficiency (g-polymer/g-TiCl$_3$) | 2,400 | 2,450 | 2,370 | 2,400 |
|  | Activity (g-polymer/g-TiCl$_3$ · hr) | 4,100 | 3,970 | 4,060 | 2,000 |
| Block copolymer | Silicon content (ppm) | 305 | 420 | 114 | — |
|  | Bulk density (g/cc) | 0.45 | 0.45 | 0.44 | 0.45 |
|  | Angle of repose (degree) | 40 | 39 | 41 | 40 |
|  | n-Hexane extraction residue (wt %) | 97.8 | 97.5 | 97.6 | 97.6 |

|  |  | Example 12 | Comparative Example 9 | Example 13 | Comparative Example 10 |
|---|---|---|---|---|---|
|  | Added polysiloxane |  |  |  |  |
| 1st step polymerization | Name | Shin-etsu Silicone KF96 | — | Shin-etsu Silicone KF54 | — |
|  | Amount (g) | 0.07 | — | 0.35 | — |
|  | Catalyst efficiency (g-PP/g-TiCl$_3$) | 13,960 | 14,000 | 13,880 | 13,900 |
|  | Bulk density (g/cc) | 0.46 | 0.46 | 0.46 | 0.46 |
|  | Angle of repose (degree) | 32 | 33 | 33 | 32 |
|  | n-Hexane extraction residue (wt %) | 99.3 | 99.4 | 99.2 | 99.3 |
| 2nd step polymerization | Polymer subjected to polymerization (g) | 295 | 320 | 222 | 220 |
|  | Polymerization time (min) | 30 | 60 | 35 | 75 |
|  | Catalyst efficiency (g-polymer/g-TiCl$_3$) | 2,430 | 2,510 | 2,430 | 2,200 |
|  | Activity (g-polymer/g-TiCl$_3$ · hr) | 4,860 | 2,510 | 4,170 | 1,760 |
| Block copolymer | Silicon content (ppm) | 70 | — | 302 | — |
|  | Bulk density (g/cc) | 0.45 | 0.45 | 0.44 | 0.45 |
|  | Angle of repose (degree) | 36 | 37 | 40 | 39 |
|  | n-Hexane extraction | 99.2 | 99.3 | 97.7 | 98.0 |

TABLE 3-continued residue (wt %)

(*1) Silicone Oil (dimethylpolysiloxane) manufactured by Shin-etsu Chemical Co., Ltd. Viscosity: 20 centistokes
(*2) Silicone Oil (methylhydrogen silicone oil) manufactured by Shin-etsu Chemical Co., Ltd. Viscosity: 15-40 centistokes
(*3) Silicone Oil (methylphenyl silicone oil) manufactured by Shin-etsu Chemical Co., Ltd. Viscosity: 400 centistokes According to the method of the present invention, the gas phase polymerization of the second step can be conducted at an extremely high activity without bringing about an adverse phenomenon such as adhesion and while maintaining flowability, and it is thereby possible to obtain a block copolymer having excellent powder properties and impact resistance. Especially in the continuous process, the withdrawal of the block copolymer can be smoothly conducted, whereby a product having a stabilized quality can be obtained.

We claim:

1. A method for producing an α-olefin block copolymer, which comprises polymerizing propylene alone or together with a small amount of other α-olefin in the presence of a catalyst comprising a titanium-containing solid catalyst component and an organoaluminum compound, and then polymerizing the resulting propylene polymer with an α-olefin other than propylene, alone or together with propylene in a gas phase without deactivating the catalyst, characterized in that the gas phase polymerization is conducted in the presence of an additive consisting essentially of a polysiloxane in an amount of from $1 \times 10^{-6}$ to 0.1 by weight ratio relative to the weight of the propylene polymer obtained in the first step, wherein said polysiloxane consists essentially of repeating units of the formula:

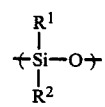

wherein each of $R^1$ and $R^2$ is a hydrogen atom, an alkyl group having from 1 to 20 carbon atoms, aryl group or a halogen atom, and a degree of polymerization of from 2 to 3,000.

2. The method according of claim 1, wherein the amount of the siloxane or the polysiloxane is from $5 \times 10^{-6}$ to 0.01 by weight ratio relative to the weight of the propylene polymer obtained in the first step.

3. The method according to claim 1, wherein the polysiloxane is an oil.

4. The method according to claim 1, wherein the catalyst comprises titanium trichloride and a dialkylaluminum chloride.

5. The method according to claim 1, wherein the amount of the polysiloxane is from 1 to $1 \times 10^5$% by weight relative to the weight of the solid catalyst.

* * * * *